(12) United States Patent
Sullivan et al.

(10) Patent No.: US 10,473,837 B2
(45) Date of Patent: Nov. 12, 2019

(54) 3D LENS WITH REDUCED BACK REFLECTANCE

(71) Applicant: Iridian Spectral Technologies, Ltd., Ottawa (CA)

(72) Inventors: Brian Thomas Sullivan, Ottawa (CA); Graham Carlow, Ottawa (CA); Michelle Derouin, Metcalfe (CA); Peter Hook, Kemptville (CA)

(73) Assignee: IRIDIAN SPECTRAL TECHNOLOGIES, LTD., Ottawa (CA)

( * ) Notice: Subject to any disclaimer, the term of this patent is extended or adjusted under 35 U.S.C. 154(b) by 0 days.

(21) Appl. No.: 15/259,427

(22) Filed: Sep. 8, 2016

(65) Prior Publication Data

US 2017/0068028 A1    Mar. 9, 2017

Related U.S. Application Data

(60) Provisional application No. 62/215,279, filed on Sep. 8, 2015.

(51) Int. Cl.
*G02B 5/28*    (2006.01)
*G02B 27/22*   (2018.01)
*G02B 1/116*   (2015.01)

(52) U.S. Cl.
CPC .............. *G02B 5/286* (2013.01); *G02B 1/116* (2013.01); *G02B 27/2207* (2013.01)

(58) Field of Classification Search
CPC .......... G02B 5/286; G02B 5/28; G02B 5/288; G02B 5/285; G02B 5/22; G02B 5/223; G02B 1/115; G02B 1/116; G02B 27/22; G02B 27/2207; G02B 27/26; G02B 27/2228; H04N 13/0431; H04N 13/00; H04N 13/0434; H04N 13/0409; H04N 13/0459; H04N 2213/008; G02C 7/10; G02C 7/12; G02C 7/02
USPC ....... 359/580, 581, 585–590, 464, 466, 467, 359/477, 885, 890, 891, 892; 351/159.6, 351/159.62, 159.63, 159.65, 159.75
See application file for complete search history.

(56) References Cited

U.S. PATENT DOCUMENTS

| | | | |
|---|---|---|---|
| 5,521,759 A | 5/1996 | Dobrowolski et al. | |
| 2013/0182322 A1 | 7/2013 | Silverstein | |

(Continued)

OTHER PUBLICATIONS

European Search Report, dated Dec. 7, 2016 (EP16187529).

*Primary Examiner* — Jie Lei
(74) *Attorney, Agent, or Firm* — Thomas Horstemey, LLP

(57) ABSTRACT

An optical interference coating with reduced back reflectance for 3D glasses based on colour separation has a substantial transmittance at one or more passbands over the visible spectral range in order to view the desired left (right) eye image and a substantial reflectance and absorption at one or more different blocking bands over the visible spectral range in order to block the undesired right (left) eye image while simultaneously reducing the back reflectance of visible light towards the viewer's eye. The thicknesses and materials are chosen such that the left eye reduced back reflectance 3D coated lens transmits the desired left eye image and blocks the right eye image while the right eye reduced back reflectance 3D coated lens transmits the desired right eye image and blocks the left eye image so that a 3D image can be viewed whilst substantially reducing distracting back reflections from the coated lenses.

20 Claims, 13 Drawing Sheets

(56) References Cited

U.S. PATENT DOCUMENTS

2013/0342904 A1   12/2013  Richards
2014/0233105 A1    8/2014  Schmeder et al.

3D LENS WITH REDUCED BACK REFLECTANCE

CROSS REFERENCE TO RELATED APPLICATIONS

This application claims priority to, and the benefit of, U.S. Provisional Patent Application No. 62/215,279, entitled "3D LENS WITH REDUCED BACK REFLECTANCE" and filed on Sep. 8, 2015, which is incorporated by reference as if set forth herein in its entirety.

FIELD OF THE INVENTION

This invention relates to the field of 3D projection, and in particular to a lens for 3D glasses based on colour separation, and glasses containing such a lens.

BACKGROUND OF THE INVENTION

The expression "3D glasses" as used herein means glasses intended to be worn by a viewer to create a three-dimensional viewing experience when viewing displayed images. 3D glasses are used for various 3D display and cinema applications in order to project different images to a viewer's left and right eyes. There are various types of 3D glasses available including those that separate the left and right images using principles based on linear or circular polarization, active shuttering and colour separation. For the latter mode of image separation, different wavelength bands of light are directed to a viewer's left and right eye via a projector or a display and the 3D colour separation glasses transmit the desired wavelength bands (for the image of one eye) and block the undesired wavelength bands (for the image of the other eye).

The earliest versions of 3D colour separation glasses relied on just a single band; however, more recent versions employ three or more bands per eye in order to achieve a good colour balance for the images for each eye. Each eye therefore sees a full colour image, but using different wavelength bands for the primary colours. The simplest 3D colour separation glasses employed absorption in the lenses—typically a colour plastic film was used. With three or more colour bands and the need for precise wavelength alignment of the wavelength bands, optical interference filters are usually employed to achieve the colour separation by having substantial transmitting and reflecting bands for the passband and blocking bands, respectively. For example, a 3D coated lens for a given eye may be required to transmit wavelength bands $[\lambda_{S1}-\lambda_{F1}]$, $[\lambda_{S2}-\lambda_{F2}]$ and $[\lambda_{S3}-\lambda_{F3}]$ and block wavelength bands $[\lambda_{S4}-\lambda_{F4}]$, $[\lambda_{S5}-\lambda_{F5}]$ and $[\lambda_{S6}-\lambda_{F6}]$ by reflecting them, where $\lambda_n$ and $\lambda_n$ are the start and final wavelength boundaries of the $n^{th}$ band. The 3D coated lens for the other eye is then required to transmit the wavelength bands $[\lambda_{S4}-\lambda_{F4}]$, $[\lambda_{S5}-\lambda_{F5}]$ and $[\lambda_{S6}-\lambda_{F6}]$ and block the wavelength bands $[\lambda_{S1}-\lambda_{F1}]$, $[\lambda_{S2}-\lambda_{F2}]$ and $[\lambda_{S3}-\lambda_{F3}]$ by reflecting them. In this manner, a viewer's eyes see only the separate desired images thus allowing the viewer to see a 3D image. Inherent in optical interference filters is that fact that the spectral bands shift towards lower wavelengths as the angle of incidence of light on the lenses increases. This can limit the field of view for optical interference filters as light from a high field of view has a corresponding high angle of incidence such that desired wavelength bands of light can be now be reflected instead of transmitted while the undesired bands of light can now be transmitted instead of reflected.

The optical interference based filters currently used in 3D colour separation glasses consist of a stack of substantially non-absorbing thin film materials in order to maximize the transmittance of light in the bands that need to be transmitted to a given eye. The thin film materials are arranged with adjacent layers have alternating high and low refractive indices. The undesired bands of light are blocked primarily by reflectance and not by absorption. Such high reflectance 3D filters give rise to unwanted reflections of ambient light, which can cause a visual distraction. In addition, the 3D optical coatings are usually deposited on the concave side of curved transparent lenses with a typical radius of curvature from 60 to 140 mm. Ambient light can reflect off the concave surface and into the viewer's eye. As a consequence, a viewer wearing 3D colour separation glasses can see a substantial reflectance of ambient light off the back (concave) surface of the 3D coated lens and also see an image of their face and eyes reflected back to them. This back reflectance effect can be distracting and is worse if the viewing room is not completely darkened. In addition, light from the projectors or displays can be reflected off nearby ambient objects and be reflected back directly to the viewer's eye or indirectly by reflecting off the viewer's face back to the coated lens and then back to the viewer's eye.

The amount of back reflectance of the 3D optical filter coated concave side of a lens can be slightly reduced by applying an anti-reflectance coating to the convex surface of the lens. The amount of light that is reflected back to a viewer's eye is then reduced by 3 to 4%. However, this is a small percentage relative to the total light reflected back towards the viewer's eye by the 3D optical filter and in practice does not significantly reduce the back reflectance distraction.

In another approach, the back reflectance distraction can be minimized by designing the glasses frames such that the ambient light, whether from the projector or another light source, is blocked from reaching the back of the coated lens. However, even with a good frame design, sufficient ambient light is usually able to reach the coated lens to create a visual distraction.

A further distraction can arise as a result of some of the desired light transmitted through the coated 3D lens being reflected off the viewer's face. As mentioned previously, the spectral bands transmitted by the coated lens are shifted towards lower wavelengths as the angle of incidence on the coating increased. The transmitted desired light that has been reflected off a viewer's face can be then be incident upon the back surface of the 3D coated lens at such an angle that this light is now reflected back towards viewer's eye creating a visual distraction.

With cinema applications using a Xenon-based projection, the visual distraction of the back reflectance was such deemed acceptable with suitable glasses frames and a darkened viewing room. However, with the advent of laser projection ("6P") based cinema, the amount of light being projected is more than doubled. With 6P cinema, three laser bands (Short-Blue, Short-Green and Short-Red) are dedicated to one eye and three other laser bands (Long-Blue, Long-Green and Long-Red) are dedicated to the other eye. With the increased light being projected there is more indirectly reflected laser light getting to the back side of the coatings as well as more desired light transmitted through the coated lenses. As explained above, this coated lens back reflectance effect can result in a significantly worse distraction (i.e., viewer's face around the eyes being visible) for 6P projectors compared to Xenon projectors.

SUMMARY OF THE INVENTION

Embodiments of the invention reduce the back reflectance of light from the coated lens in order to reduce the visual distraction of the reflected light, especially for 3D applications using 6P lasers, and in particular reduce the (relative change in transmittance)/(relative change in luminance back reflectance) ratio for at least one of passbands to less than about 0.5.

Embodiments of the invention thus provide an improved 3D viewing experience, using reduced back reflectance 3D glasses, through reduced visual distractions, especially for a laser (6P) projection system, typically used in cinema or large hall viewing, where the increased light source intensity helps overcome any concerns of employing absorption layers in reduced back reflectance 3D filters.

According to the present invention there is provided a lens for 3D glasses with reduced back reflectance having an optical interference filter deposited on one or both sides thereof, said optical interference filter comprising a stack of non-absorbing thin film layers incorporating one or more substantially absorbing thin film layers, the number, materials and thicknesses of said thin film layers being selected such that the 3D optical interference filter has substantial transmittance at one or more passbands over the visible spectral range in order to view a desired left or right eye image, and a substantial reflectance and absorption at one or more different blocking bands over the visible spectral range in order to block the undesired right or left eye image, and wherein the (relative change in transmittance)/(relative change in luminance back reflectance) ratio for at least one of said passbands is less than about 0.5, where the relative change is with respect to the transmittance and luminance back reflectance performance based on setting the thicknesses of said one or more absorbing layers to 0 nm.

The expression "substantially transmit" or "substantial transmittance" as used herein means that the transmittance of light is greater than 50%.

The lens should be at least partially transparent for the wavelengths of interest, the visible spectrum, namely 380 nm to 780 nm. In addition, the lens is usually spherically curved forming an eyewear lens with a typical radius of curvature from 60 to 150 mm. The radius of curvature of the lens is usually chosen based on the coating thickness uniformity across the lens while taking into account the reduced angle of incidence on light on the lens for a high field of view.

The visible spectral range or visible spectrum means wavelengths from 380 to 780 nm. In practice, there is low sensitivity of the eye (as shown by the photopic curve) below 400 nm and above 700 nm; therefore a spectral (wavelength) range of 400 to 700 nm is usually adequate in specifying optical filters for the visible spectral range. The photopic curve represents the sensitivity of the eye over the visible spectral range from 380 nm to 780 nm.

In accordance with the embodiments of the invention, an optical thin film interference filter with reduced back reflectance having at least one substantially absorbing thin film layer is coated on one or both sides of a substantially transparent lens. The filters with reduced back reflectance are designed to have a substantial transmittance at one or more passbands over the visible spectral range in order to view the desired left (right) eye image and a substantial reflectance and absorption at one or more different reflect bands over the visible spectral range in order to block the undesired right (left) eye image while simultaneously reducing the back reflectance of visible light, whatever the source, towards the viewer's face. The thickness of the absorbing layer material or materials are chosen such that the luminance (photopic) back reflectance of the coatings is substantially reduced while minimizing the transmittance loss of the filter's desired passbands. To those practiced in the art of optical coatings, this requires the optimum positioning of the one or more absorbing layers in the multilayer stack of the reduced back reflectance 3D coatings.

For different viewing venues, it may be acceptable to have an absolute loss of 1% to 20% (or more) in the desired transmittance passbands to achieve an absolute 8% to 43% reduction (or more) in the luminance back reflectance of the coatings. With the advent of 6P (laser) display venues, the significant increase in the display light source intensity (more than doubled compared to Xenon light sources) can more than offset the transmittance loss in the reduced back reflectance 3D coating passbands while achieving substantial reductions in the back reflectance of the reduced back reflectance 3D coatings. Previously, for Xenon (i.e. white light) displays, the trade-off in transmittance level for a lower back reflectance would have not have been deemed acceptable for most display venues as the 3D viewing experience was already judged to be 'too dim'.

In one preferred embodiment, a reduced back reflectance 3D coating is deposited on the concave side of a transparent glass or plastic lens to substantially reduce the back reflectance from a luminance reflectance of 70% to 35% while keeping the desired average passband transmittance greater than 65%. In another embodiment, a reduced back reflectance 3D coating is deposited on the concave side of a transparent glass or plastic lens to reduce the back reflectance from the 3D coated lens and an anti-reflectance coating is deposited on the convex side of the said lens to partially compensate for the lowered transmittance through the passbands.

In yet another embodiment, there is a reduced back reflectance 3D glasses device, consisting of a left reduced back reflectance 3D optical coated lens and a right reduced back reflectance 3D optical coated lens, held in a suitable set of frames, so that the viewer has a substantially lower back reflectance from the 3D optical coatings on the lenses.

The substantial transmittance of the reduced back reflectance 3D optical coatings on each of the lenses allows a relatively high overall transmittance of the filter passbands to view the desired left (right) eye image while still substantially blocking the undesired right (left) eye image, through a combination of reflectance and absorption, and simultaneously reducing the overall luminance back reflectance thus minimizing the distraction of the back reflectance towards the viewer's face while allowing the desired 3D image to be formed when using the reduced back reflectance 3D glasses device.

The one or more absorbing thin film layers may be sandwiched on one or both sides by adjacent thin metal or semiconductor layers that form a finite, thin stable dielectric layer in either an oxygen plasma during deposition or a post-deposition anneal process to protect the substantially absorbing layer from being subsequently oxidized.

According to another aspect of the invention there is provided a method of making a lens for 3D glasses with reduced back reflectance having an optical interference filter deposited on one or both sides thereof, comprising creating a computer model of a 3D optical interference filter comprising a basic stack of non-absorbing thin film layers necessary to achieve the desired 3D filter optical performance and an appended stack of thin film layers, incorporating one or more substantially absorbing thin film layers, placed adjacent to the said basic stack, with the total stack of layers having substantial transmittance at one or more passbands over the visible spectral range in order to view a desired left or right eye image, and a substantial reflectance and absorption at one or more different blocking bands over the visible spectral range in order to block the undesired right or left eye image; varying in said computer model at least one variable selected from the group consisting of the material, thickness and number of said thin film layers to ensure at least one of said passbands has a (relative change in transmittance/(relative change in luminance back reflectance) ratio less than about 0.5, where the relative change is with respect to the transmittance and luminance back reflectance performance based on the said previous basic stack of non-absorbing layers, and depositing said absorbing and non-absorbing layers on a lens substrate in accordance with said computer model.

BRIEF DESCRIPTION OF THE DRAWINGS

The invention will now be described in more detail, by way of example only, with reference to the accompanying drawings, in which.

DETAILED DESCRIPTION OF EMBODIMENTS OF THE INVENTION

Figure 1:
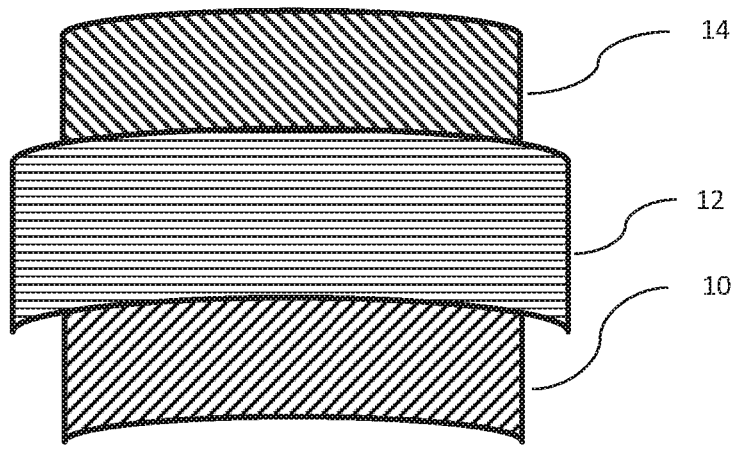
FIG. 1 shows an optical interference filter with reduced back reflectance deposited on one or both sides of a substrate.

The luminance or photopic reflectance (transmittance) of an optical coating is a standard measure of the overall amount of light that is seen by the eye for light reflected (transmitted) by an optical coating. The luminance reflectance (transmittance) is calculated by multiplying, at 1 nm or 5 nm intervals from 380 nm to 780 nm, the reflectance (transmittance) of the optical coating by the photopic value at those wavelengths and then summing up these values and normalizing. For instance, if an optical coating had a reflectance of 100% from 380 to 780 nm, then this would correspond to a luminance reflectance (LR) of 100% for this optical coating.

A non-absorbing substrate substantially transmits most wavelengths of light over the wavelength region of interest. As an example, for an eye a non-absorbing substrate is one that substantially transmits most of the visible spectrum region from 380 nm to 780 nm;

An optical coating or optical filter is a thin film filter that uses the principle of optical interference to transmit, reflect or absorb different wavelengths of light over a spectral range of interest. A thin film filter typically consists of a series of thin film layers: the thicknesses of the layers can typically vary from 0.1 nm to more than 10000 nm and the refractive index of the non-absorbing layer materials can typically vary from 1.2 to 5.0 in the visible spectral range. In addition, some materials may also have some absorption over the wavelength region of interest (with an extinction coefficient typically varying from $1.0 \times 10^{-8}$ to 30.0 and with refractive indices that are less than 1.0). To obtain a desired spectral performance (where the transmittance, reflectance or absorption vary in a specified way across a wavelength region of interest), the number of layers, the layer thicknesses, and the materials in an optical coating are optimized in a manner known in the art.

Typically, an optical coating for 3D glasses will consist of alternating layers of a low and high index material with low absorption in the spectral range of interest. Typical low index materials for the visible spectral range are, but not limited to, $SiO_2$, SiO, $MgF_2$, $CaF_2$. Typical high index materials are, but not limited to, $Ta_2O_5$, $Nb_2O_5$, $Al_2O_3$, SiN, $TiO_2$. Typical substantial absorbing materials are thin film metal or semiconductor layers such as Ni, Cr, Ag, Ti, Si, Ge and Inconel to name but a few. Inconel™, which is a trademark of Special Metals Corporation, is a family of austenite nickel-chromium-based superalloys. Inconel™ is very robust as a thin film material even in oxide plasmas and at high temperatures. All of these materials can be deposited using a number of different deposition methods including physical vapour deposition, chemical vapour deposition, and sol-gel deposition.

The method of calculating the optical performance of the optical coatings and the deposition method used to deposit the coatings is not relevant to the invention. Typically, the number, thicknesses, and materials of the thin films are determined in a computer model based on the desired spectral characteristics of the coating. Once the desired characteristics have been achieved in the computer model, the layers are then deposited on a substrate by conventional means. An excellent overall reference to the field of optical coatings is Angus Macleod's "Optical Thin Film Filters" book ($4^{th}$ Edition, 2012), the contents of which are herein incorporated by reference. Optical filters based on thin film optical interference have a wavelength shift depending on the angle of incidence of light incident upon the coating. For 3D filters, this has to be taken into account to obtain a good 3D viewing experience but this is well-known to those practised in the art of designing and manufacturing optical filters.

For a lens mounted on a frame and worn by a viewer, the term 'back reflectance' refers to the light that is reflected from the side of the lens that is closest to the viewer's face while the term 'forward reflectance' refers to light that is reflected from the side of the lens that is furthest away from the face. For a non-absorbing 3D coated lens, the magnitude of the back reflectance and forward reflectance is the same; however, if there is absorption in the 3D coated lens, the magnitude of the back reflectance can be substantially different compared the magnitude of the forward reflectance.

A 3D filter is an optical coating used for 3D viewing based on the principle of colour separation that is designed to have a substantial transmittance at one or more passbands over the visible spectral range in order to view the desired left (right) eye image and a substantial reflectance at one or more different reflect bands over the visible spectral range in order to block the undesired right (left) eye image.

A 3D optical coated lens is a lens with a coating deposited on one or both sides of the lens for use in 3D glasses where the lens can have parallel sides or non-parallel sides and the sides of the substrates can have a positive or negative radius of curvature varying from 20 mm up to infinity (flat surface) and the curvatures on the two surfaces may be different. The lens can be made of a glass material, a plastic material (such as polycarbonate, CR39, . . . ), or any other suitable material.

A 3D filter with reduced back reflectance is a 3D filter that is designed with absorbing materials to have a substantial transmittance at one or more passbands over the visible spectral range in order to view the desired left (right) eye image and a substantial forward reflectance at one or more different reflect bands over the visible spectral range in order to block the undesired right (left) eye image while simultaneously reducing the back reflectance of visible light, whatever the source, towards the viewer's eye. The thickness of the absorbing layer material or materials are chosen such that the photopic back reflectance of the coatings is substantially reduced while minimizing the transmittance loss of the filter's desired passbands. To those practiced in the art of optical coatings, this requires the optimum positioning of the one or more absorbing layers in the multilayer stack of the reduced back reflectance 3D coatings.

A 3D coated lens with reduced back reflectance is a reduced back reflectance 3D filter deposited on one or both sides of a lens where the lens in practice can have parallel sides or non-parallel sides and the sides of the substrates can have a positive or negative radius of curvature varying from 20 mm up to infinity (flat surface) and the curvatures on the two surfaces may be different. The lens can be made of a glass material, a plastic material (such as polycarbonate, CR39, . . . ), or any other suitable material.

Figure 2:
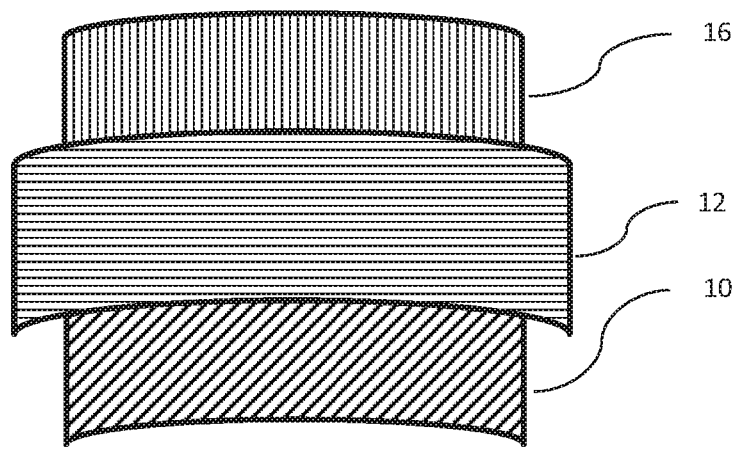
FIG. 2 shows a filter with reduced back reflectance deposited on one or both sides of a lens.

In accordance with embodiments of the invention, a 3D filter with reduced back reflectance 10, 14 in the form of an optical coating is coated on both sides of a lens (12) as depicted in FIG. 1. Optionally the coating may be deposited on only one side of the lens. In one embodiment, the 3D filter (10) with reduced back reflectance is coated on the concave side of the lens (12) and an anti-reflectance coating (16) is deposited on the convex side of the lens (12), as depicted in FIG. 2.

Figure 3:
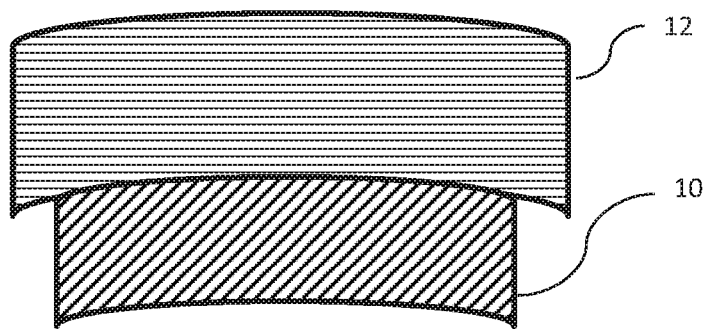
FIG. 3 shows a filter with reduced back reflectance deposited on the concave side of a lens.

In yet another embodiment, the 3D filter (10) with reduced back reflectance is coated only on the concave side of the lens (12) as depicted in FIG. 3.

Note that while the lens (12) is depicted in FIGS. 1 to 6 as having curved sides, in practice it can have parallel sides or non-parallel sides and the sides of the substrates can have a positive or negative radius of curvature varying from 20 mm up to infinity (flat surface) and the curvatures on the two surfaces may be different.

In all of the embodiments, the reduced back reflectance 3D filters 10, 14 are designed to have a substantial transmittance at one or more passbands over the visible spectral range in order to view the desired left (right) eye image and a substantial forward reflectance and absorption at one or more different block bands over the visible spectral range in order to block the undesired right (left) eye image while simultaneously reducing the back reflectance of visible light, whatever the source, towards the viewer's face. The thickness of the absorbing layer material or materials are chosen such that the luminance back reflectance of the coatings is reduced while minimizing the transmittance loss of the filter's desired passbands.

Figure 4:
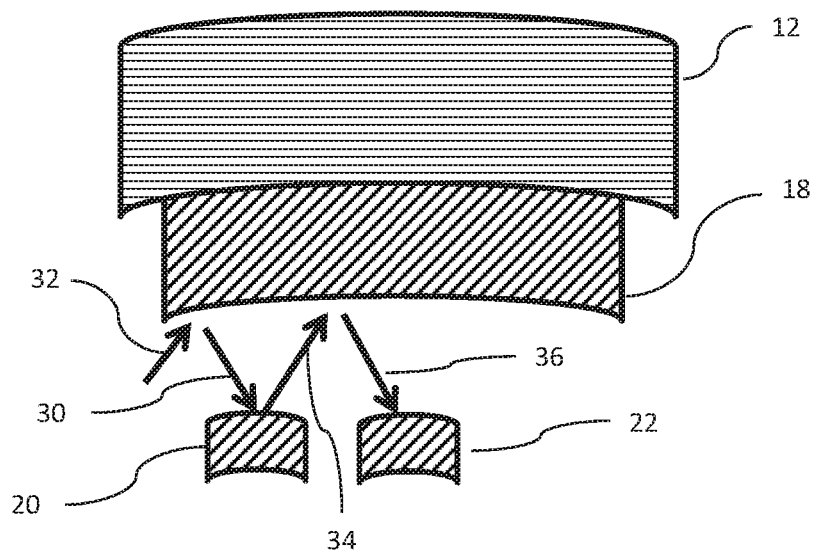
FIG. 4 shows a coating deposited on the concave side of a lens and ambient visible light or indirect light from the display reflected off the back side of the concave coated lens reflected off the face of a viewer wearing 3D colour separation glasses and subsequently reflected off the back side of the concave coated lens again and then into the viewer's eye.
Figure 5:
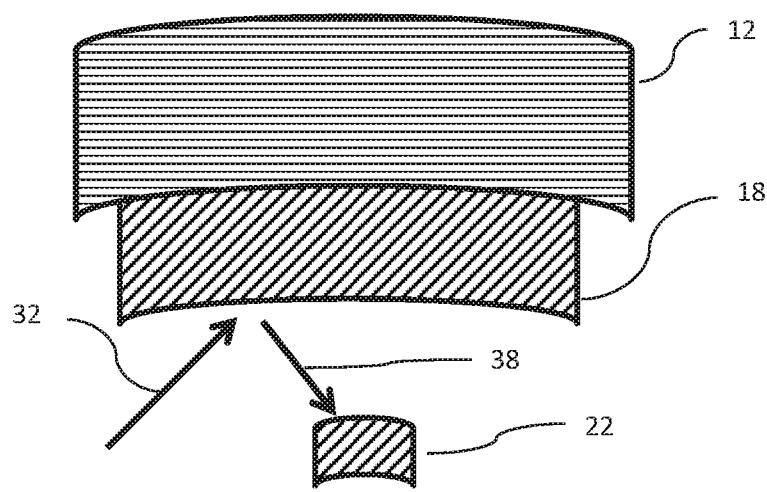
FIG. 5 shows a coating deposited on the concave side of a lens and ambient visible light or indirect light from the display reflected off the backside of the concave coated lens then directly into the viewer's eye.
Figure 6:
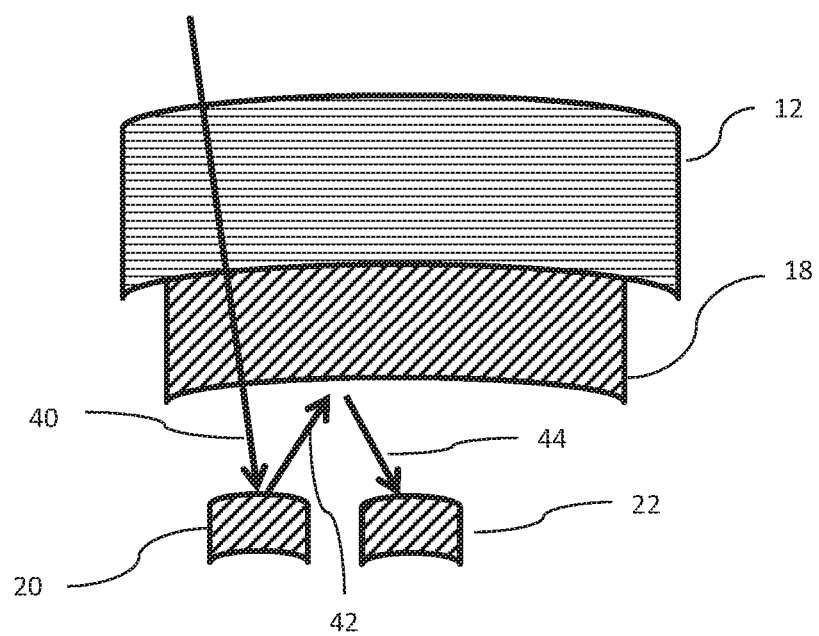
FIG. 6 shows a coating deposited on the concave side of a lens and direct light from the display be transmitted through the lens reflected off the face of a viewer wearing 3D colour separation glasses and subsequently reflected off the back side of the concave coated lens again and then into the viewer's eye.

A substantial back reflectance of a 3D optical coated lens can cause visual distractions in a number of ways. FIGS. 4 to 6 depict some of the, but not all, the visual distractions that can be created by a substantial back reflectance of a 3D optical coated lens.

FIG. 4 depicts, by way of example, how a visual distraction of the viewer's face may be caused by a back reflectance of a 3D optical coating: light (32), either ambient or from laser light from a laser projector which has been reflected off different objects, strikes the concave side of the 3D optical coated lens which has a 3D optical coating (18) deposited on the concave side of a lens (12). Some of this light (32) is reflected back (30) towards the viewer's face (20) where some of this light is then reflected back (34) to the concave side of the 3D optical coated lens where it is again reflected (36) such that it reaches the viewer's eye (22). The light entering the eye (36) creates a visual distraction as the viewer is able to see part of their face around their eyes; the degree of the visual distraction depends upon the back reflectance of the 3D optical coating.

FIG. 5 depicts, by way of example, of how extraneous light can cause a visual distraction depending on the back reflectance of a 3D coating: light (32), either ambient or from light from a (i.e. laser or Xenon light) projector which has been reflected off different objects, strikes the concave side of the 3D optical coated lens which has a 3D coating (18) deposited on the concave side of a lens (12). Some of this light (32) is directly reflected (38) into the viewer's eye (22). The light entering the eye (38) creates a visual distraction as the viewer is able to see the surrounding environment; again, the degree of the visual distraction depends upon the back reflectance of the 3D optical coating.

FIG. 6 depicts, by way of example, another way of how a visual distraction of the viewer's face may be caused by the back reflectance of a 3D optical coating: light (40), either incident to the lens at a normal or oblique angle, is transmitted by the 3D optical coating (18) deposited on the concave side of a lens (12). Some of this light (40) is incident upon the viewer's face (20) where some of this light is then reflected back (42) to the concave side of the 3D optical coated lens where it is reflected (44) such that it reaches the viewer's eye (22). The light entering the eye (44) creates a visual distraction as the viewer is able to see part of their face around their eyes; the degree of the visual distraction depends upon the back reflectance of the 3D optical coating as well as the incident angle of light reflected back towards the concave side of the 3D coated lens.

Figure 7:
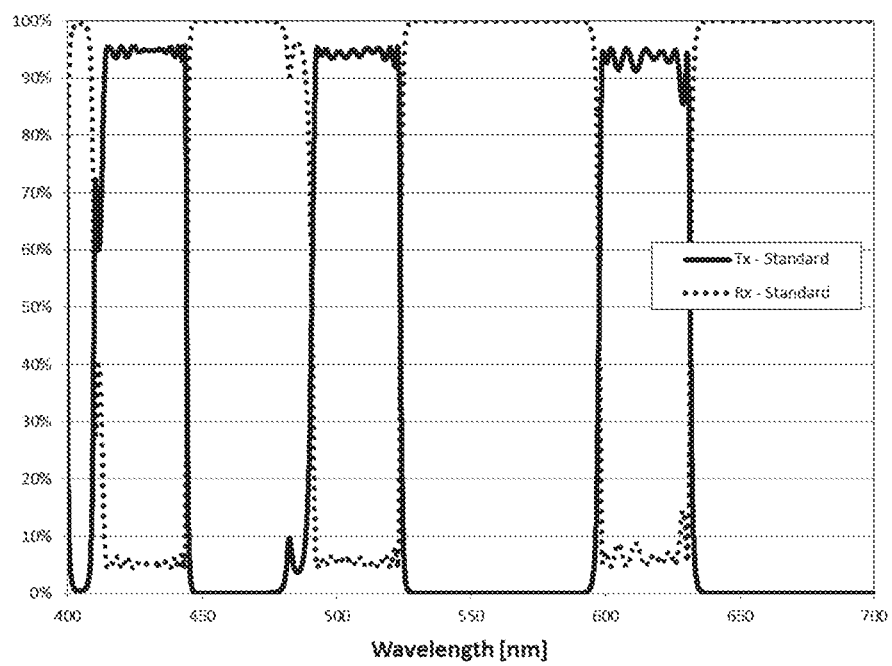
FIG. 7 shows by way of an example the typical theoretical transmittance and reflectance of a prior optical coating designed to transmit the image intended for one eye while reflecting the image intended for the other eye. The transmittance (solid line) and reflectance (dashed line) of the prior art optical coating on the lens is plotted against wavelength from 400 to 700 nm (visible light spectrum). The luminance back reflectance of this prior art optical coating is ~79%.

FIG. 7 depicts, by way of example, a simulation of the typical theoretical transmittance (Tx—Solid Line) and back reflectance (Rx—Dashed Line) of a 3D optical coated lens according to prior art ('standard') with the 3D optical coating (10) deposited on the concave side of a lens (12) with no coating on the convex side of a lens, as in the configuration of FIG. 3. A prior art 3D filter typically consists of oxide materials (e.g., a low index material ($SiO_2$ ...) and a high index material ($Ta_2O_5$, $Nb_2O_5$, $TiO_2$ ...) so that the 3D filter passbands have a substantial transmittance (e.g., >65-70%). In practice, these oxide materials may have a small extinction coefficient, especially below 500 nm; however, this small absorption in the 3D filter does not significantly impact the back reflectance of the 3D filter. For the purpose of this example, the spectral data in FIG. 7 was calculated using typical dispersive refractive indices for $SiO_2$ (n=1.460 @ $\lambda$=550 nm) and $Nb_2O_5$ (n=2.349 @ $\lambda$=550 nm) for the thin film materials and B270 optical constants (n=1.524 @ $\lambda$=550 nm) for the lens material in the simulation. As well, the extinction coefficient for the thin film materials and the lens material was assumed to be zero so that there is no absorption or scattering losses in this calculation. A 3D filter, according to prior art, can consist of anywhere from 40 to 90 layers and a metric thickness from 3.0 µm to 9.0 µm depending upon the 3D filter specifications. For this simulation, the 3D filter consisted of 77 layers for a total metric thickness of 6.6 µm. The average back reflectance (Rx) is close to 100% in the blocking bands while the average transmittance (Tx) of the passbands is around 95% (an anti-reflectance coating would increase the average transmittance to close to 100%). The theoretical luminance reflectance for this prior art 3D optical coated lens is ~74% so that the visual distractions associated with FIGS. 4 to 6 are significant, especially when viewed under bright ambient light conditions or with a laser projection light source.

In one embodiment of the invention, a 3D filter with reduced back reflectance is coated on one or both sides, (10) and (14), of a lens (12) for 3D viewing to reduce visual distractions caused by back reflectance from the 3D filter. The 3D optical coated lens with reduced back reflectance is designed to have a substantial transmittance at one or more passbands over the visible spectral range in order to view the desired left (right) eye image and a substantial forward reflectance at one or more different reflect bands over the visible spectral range in order to block the undesired right (left) eye image while simultaneously reducing the back reflectance of visible light, whatever the source, towards the viewer's eye. The thickness of an absorbing layer material or materials are chosen such that the luminance back reflectance of the coatings is substantially reduced while minimizing the transmittance loss of the filter's desired passbands. In particular, separate 3D optical coated lenses with reduced back reflectance are designed for the left eye and right eyes, taking into account the spectral properties of the light source and the fact the 3D coated lenses with reduced back reflectance are mounted in a frame used for 3D viewing based on the colour separation principle.

Figure 8:
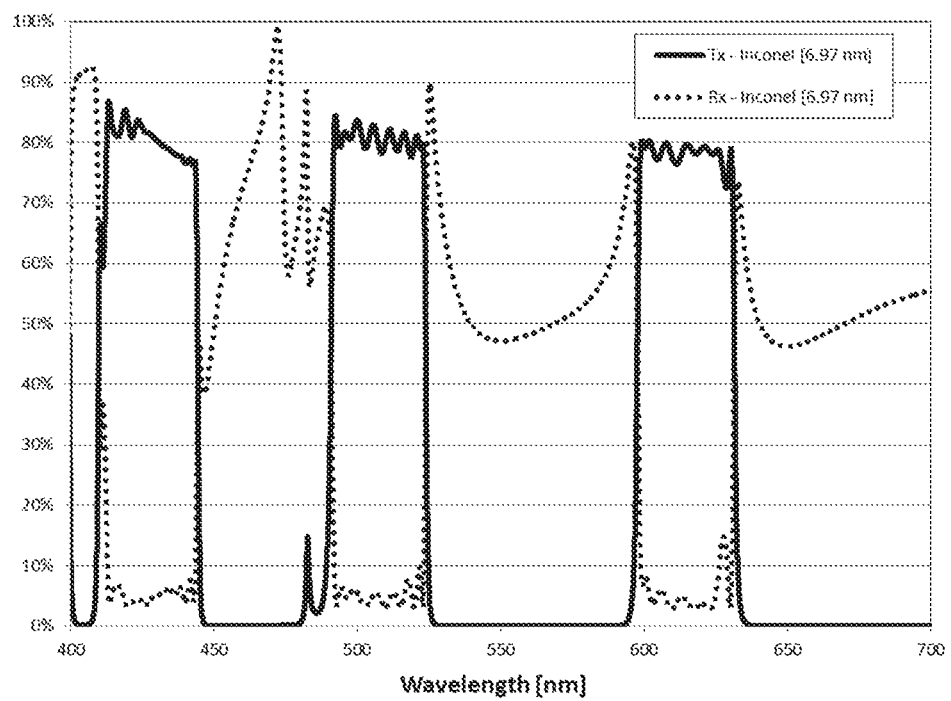
FIG. 8 shows by way of an example the typical theoretical transmittance and reflectance of an optical coating with reduced back reflectance designed to transmit the image intended for one eye while reflecting the image intended for the other eye, simultaneously substantially reducing the back reflectance of the reduced back reflectance 3D optical coating while minimizing the transmittance loss in the passband of the filter. The transmittance (solid line) and reflectance (dashed line) of the reduced back reflectance optical coating on the lens is plotted against wavelength from 400 to 700 nm (visible light spectrum). In this embodiment, there is one substantially absorbing layer of Inconel in the stack with a metric thickness of 6.97 nm. The luminance back reflectance of this reduced back reflectance 3D optical coating is ~42%.

By way of comparative example, FIG. 8 shows a simulation of the predicted theoretical performance of 3D coating (10) with reduced back reflectance deposited on the concave side of a lens (12). For this simulation, there was a single absorbing layer of Inconel (n=2.151, k=1.435 @ $\lambda$=550 nm) and nine additional non-absorbing layers in the optical multilayer coating, which consisted otherwise of the same thin film materials and lens material used in FIG. 7.

The inventors have found that an extensive refinement of all the layer thicknesses in the 3D coating is required in order to achieve a low ripple in the passband regions and to maximize the passband transmittance while simultaneously reducing the luminance back reflectance.

For this simulation, the reduced back reflectance 3D filter consisted of 87 layers for a total metric thickness of 7.1 µm, an increase of 0.5 µm in the total thickness and 10 more layers, including the Inconel layer which had a metric thickness of ~7 nm. As can be seen in the FIG. 8, both the average transmittance <Tx> of the red, green and blue bands have decreased as has the back reflectance (Rx). For comparison to prior art, the theoretical luminance back reflectance decreased significantly from 73.8% to 42.2% (a relative decrease of ~43%) while the <Tx>-Green (<TxG>) decreased from around 92.8% to 80.6% (a relative decrease of ~13%). From a comparison of FIG. 7 and FIG. 8, it is clear that there is a substantial decrease in the luminance back reflectance (~43%) for only a small <Tx> penalty of ~13% for a given passband. Of course, it will be appreciated that the average transmittance of other bands (red or blue) or the average all of the passbands could have been used instead of the average of the green band (<TxG>).

Figure 9:
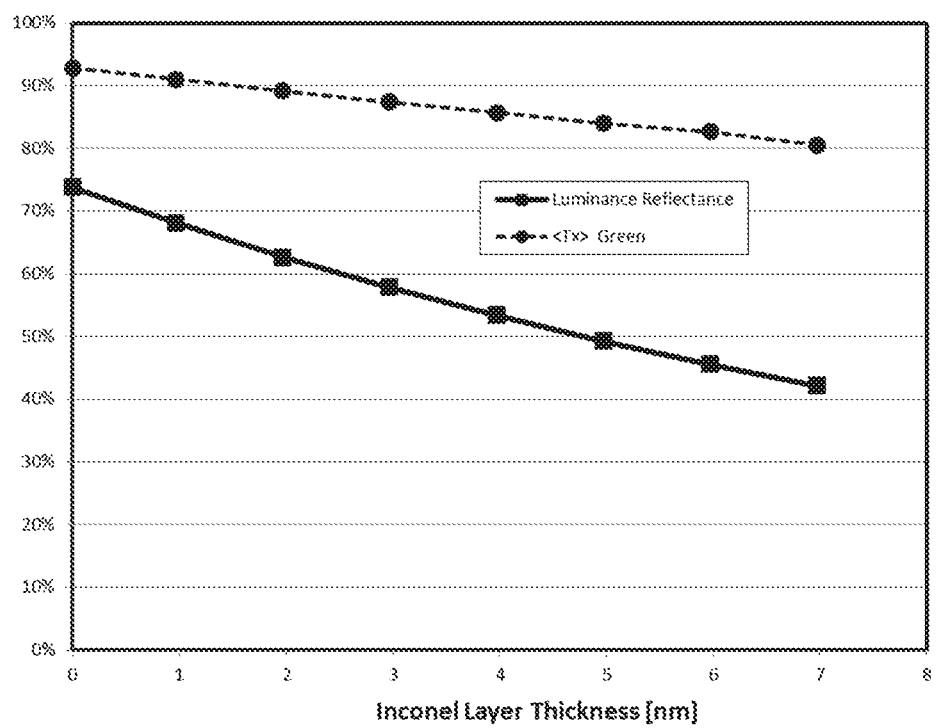
FIG. 9 shows by way of an example, for a single substantially absorbing layer of Inconel in the optical coating with reduced back reflectance, the theoretical luminance reflectance (solid line, square) and the theoretical average transmittance of the 'green' band (centered around 500 nm) (dashed line, circle) varying with the thickness of the Inconel layer from 0 to ~7 nm. From this chart, it can be seen that it is possible to adjust the reduction of the luminance reflectance and the loss in the filter passbands by adjusting Inconel layer thickness. Note that the luminance reflectance falls off quicker than the average transmittance of the green band in the reduced back reflectance coating.

FIG. 9 shows the results of a simulation where the Inconel layer thickness in a reduced back reflectance 3D filter design (as used in FIG. 8) is varied from 0 nm to ~7 nm and the resulting the <TxG> and luminance back reflectance changes. These values are also shown tabulated in Table 1. As can be seen, the luminance back reflectance falls off around 2.5 times faster than the <TxG> level. As can be seen in FIG. 9, it is possible to choose an optimum Inconel layer thickness for a given <TxG> loss or desired luminance back reflectance. Those skilled in the art will appreciate that the Inconel layer thickness can be increased to achieve an even lower luminance back reflectance at the expense of a lower transmittance in the passbands. Depending on the 3D viewing venue, a different amount of either <Tx> loss or back reflectance can be tolerated. For a 6P cinema venue, the light source intensity is typically more than a factor of two greater than that compared to a Xenon lamp cinema venue. Hence, a loss of <Tx> in the reduced back reflectance 3D filter passband can be compensated by the increased light intensity.

It is possible to achieve a relative decrease of around 10% in the luminance back reflectance without any decrease in the passband transmittance if an anti-reflectance coating is applied to the convex side of the reduced back reflectance 3D coated lens to compensate for the ~3% loss in the Tx level. In addition, if the transmittance passbands are extended in bandwidth beyond what is required for transmitting the desired wavelengths necessary for the 3D image, but not to the extent that the 3D performance is impaired, then the back reflectance can be further reduced as the reflectance bands will have been reduced in bandwidth over the visible spectral range.

Note that the values of the <TxG> and luminance back reflectance as a function of Inconel layer thickness will depend on the 3D filter specifications—a 3D filter that requires a different band of wavelengths to be blocked compared to the blocking bands shown in FIG. 8, especially near the photopic peak around a wavelength of 550 nm, can have a significantly different luminance back reflectance.

EXAMPLE

Table 1 shows by way of an example the theoretical luminance reflectance and the theoretical average transmittance of the 'green' band (centered around 500 nm) as a function of the thickness of the Inconel layer as it is varied from 0 to ~7 nm for one embodiment of a 3D optical coating with reduced back reflectance in accordance with an embodiment of the invention.

TABLE 1

| Inconel Thickness [nm] | <TxG> | LR |
| --- | --- | --- |
| 0.0 | 92.8% | 73.8% |
| 1.0 | 91.0% | 68.1% |
| 2.0 | 89.2% | 62.7% |
| 3.0 | 87.5% | 57.9% |
| 4.0 | 85.7% | 53.4% |
| 5.0 | 84.0% | 49.3% |
| 6.0 | 82.7% | 45.6% |
| 7.0 | 80.6% | 42.2% |

Two examples are provided that demonstrate some of the above embodiments using reduced back reflectance 3D filters. In the examples provided, the reduced back reflectance 3D filters were designed using alternating layers of a low index material of $SiO_2$ and a high index material of $Nb_2O_5$, with a single substantially absorbing layer of Inconel embedded in the multilayer stack. The thickness and position of the Inconel layer was chosen such that the desired luminance back reflectance is achieved with a minimum Tx loss in the passbands and a minimum increase in the total metric thickness. The advantage of a single layer of Inconel is that the disruption to the deposition process of the low and high index dielectric materials, $SiO_2$ and $Nb_2O_5$, respectively, is minimized compared to depositing more than one absorbing layers. A sputtering process was used to deposit the 3D filters with reduced back reflectance although other deposition methods could also be used. In addition, the deposition rates were determined by various tooling runs and the layer thicknesses were accurately deposited based on time alone using known deposition rates; however, other thickness control methods could also be used, including quartz crystal monitoring or in-situ optical monitoring.

To demonstrate and compare against the prior art, a left 3D filter, consisting of a total of 77 layers and a total metric thickness of 6.7 µm was deposited on the concave side of one lens and a right 3D filter, consisting of a total of 90 layers and a total metric thickness of 7.7 µm, was deposited on the concave side of another lens. After deposition, the back reflectance (i.e., measured from the concave side) of these 3D coated lenses was measured using an integrating sphere at 8° normal angle of incidence. The measured luminance reflectance was ~69% and ~59% and the <TxG> level was ~87% and ~87%, for the left and right 3D coated lenses, respectively. The measured back reflectance curves (Rx-Standard-solid lines) for the left and right 3D coated lenses are shown in FIG. 10 and FIG. 11, respectively.

For the first example, to demonstrate one embodiment of the reduced back reflectance 3D filter, according to the configuration in FIG. 3, a left reduced back reflectance 3D filter, consisting of a total of 87 layers and a total metric thickness of 7.3 µm was deposited on the concave side of one lens.

Figure 10:
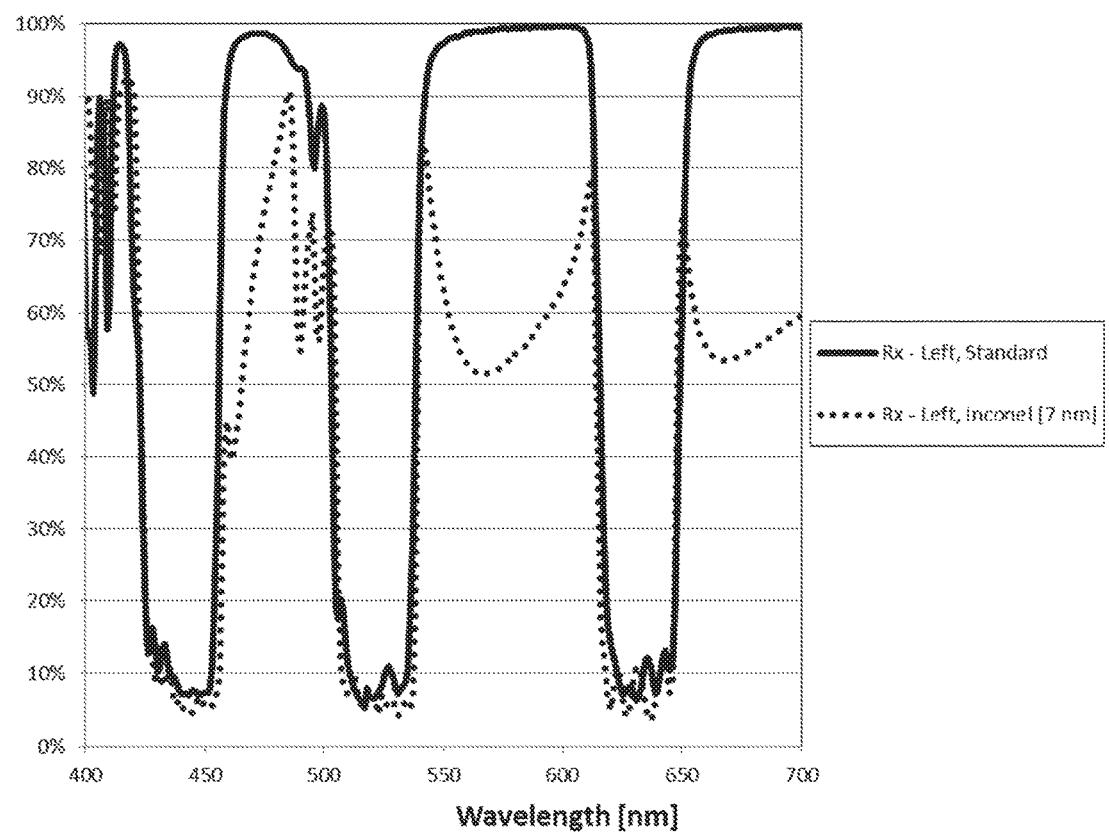
FIG. 10 shows, by way of an example, the measured back reflectance of a prior art 3D lens for the left eye (Rx-Left, Standard-solid line) and the measured back reflectance of reduced back reflectance 3D coated lens for the left eye with an Inconel layer thicknesses of ~7 nm (Rx-Left, Inconel 7 nm-dotted line).
Figure 11:
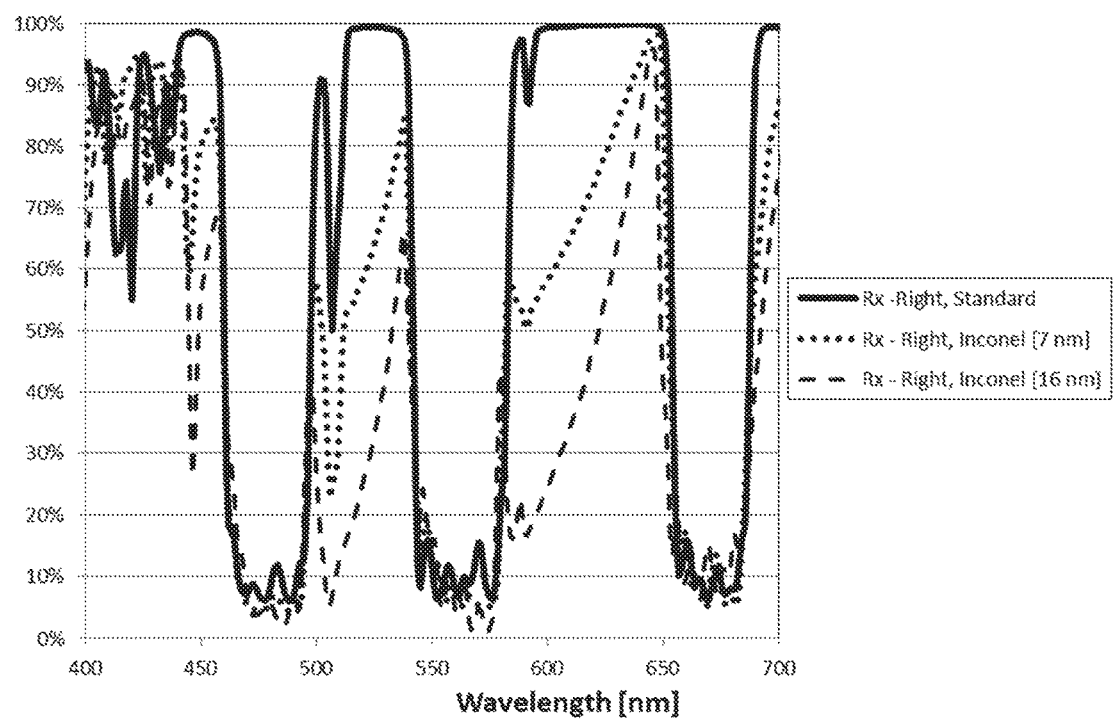
FIG. 11 shows, by way of an example, the measured back reflectance of a prior art coated lens for the right eye (Rx—Right, Standard—solid line) and the measured back reflectance of two reduced back reflectance coated lens for the right eye as well with Inconel layer thicknesses of ~7 nm (Rx-Right, Inconel 7 nm-dotted line) and ~16 nm (Rx-Right, Inconel-dashed line), respectively.

FIG. 10 shows the measured back reflectance of the left 3D filter and the left reduced back reflectance 3D filter with an Inconel layer thickness of ~7 nm. For the left reduced back reflectance 3D filter, the measured luminance back reflectance was ~45% and the measured <TxG> level was ~75%. Thus, comparing the left reduced back reflectance 3D filter to the left 3D filter, there was a relative decrease of the luminance back reflectance by 35% and a relative decrease of the <TxG> level by 13%. Holding up the left 3D coated lens (prior art) to an eye and then the left reduced back reflectance 3D coated lens to an eye, it was easily demonstrated that the latter coated lens exhibited significantly less 'face' reflection in an ambient light setting compared to the former coated lens that had no absorption layer to reduce the back reflectance.

In the second example, to demonstrate an embodiment of the reduced back reflectance 3D filter, according to the configuration in FIG. 3, a right reduced back reflectance 3D filter, consisting of a total of 101 layers and a total metric thickness of 8.3 µm was deposited on the concave side of another lens.

In this example, two right reduced back reflectance 3D filters were fabricated with two different Inconel layer thicknesses (and with the other thin film layers remaining nominally the same). FIG. 11 shows the measured back reflectance of the right 3D filter and the right reduced back reflectance 3D filter with an Inconel layer thickness of ~7 nm and ~16 nm. For the right reduced back reflectance 3D filter with an Inconel layer thickness of ~7 nm, the measured luminance back reflectance was 26% while the measured <TxG> level was 56%, respectively. Thus, comparing the right reduced back reflectance 3D filter, with an Inconel layer thickness of ~7 nm, to the right 3D filter, there was a relative decrease of the luminance back reflectance by 55% and a relative decrease of the <TxG> level by 35%. For the right reduced back reflectance 3D filter with an Inconel layer thickness of ~16 nm, the measured luminance back reflectance was 26% while the measured <TxG> level was 56%, respectively. Thus, comparing the right reduced back reflectance 3D filter, with an Inconel layer thickness of ~16 nm, to the right 3D filter, there was a relative decrease of the luminance back reflectance by 30% and a relative decrease of the <TxG> level by 17%.

Holding up the right 3D coated lens (prior art) to an eye and then each of the right reduced back reflectance 3D coated lens to an eye, it was easily demonstrated that the latter coated lenses, demonstrated one embodiment of the invention, exhibited significantly less 'face' reflection in an ambient light setting compared to the prior art 3D coated lens that had no absorption layer present to reduce the back reflectance, with the lowest face reflectance being achieved by the reduced back reflectance 3D coated lens with the Inconel layer thickness of ~16 nm, as expected based on the measured luminance reflectance.

These two examples of fabricated reduced reflectance 3D coated lens clearly demonstrate that it is possible to reduce the back reflectance significantly, whilst minimizing the transmittance loss by incorporating an absorbing layer. As demonstrated by way of these examples, all the other embodiments can be realized in a similar manner by coating reduced back reflectance 3D filters on one or both sides of a lens.

Additional Simulations

Further simulations were carried out using different layer structures based on the lens design in example 1 above. These simulations are tabulated in Table 2 below.

modified filter a transmission loss relative to the prior art of 33.4% [$\alpha(LR)=0.3341$]. Adding a single low refractive index layer underneath the metal layer has a minimal effect on the transmission loss, but adding a further non-absorbing layer on top of the metal layer to make a sandwich structure with three additional layers LMH or LML significantly reduces the transmission loss while not significantly affecting the reduction in the LR value. At the minimum at least one additional non-absorbing layer is required, making a total of at least two layers for the appended stack. Adding further layers further improves the transmission by about 1.3%. Preferably there should be at least ten additional layers including the one or more absorbing layers. The original stack is referred to herein as the basic stack and the additional layers as the appended stack. The $\gamma$ values (=(relative change in <TxG>)/(relative change in LR) ratio) varied from around 0.63, 0.42, 0.37 and 0.35 for the M, (H M H), (L M L) and (L M (LH)^4) additional layers, respectively. For this calculation, the inventors used the prior art stack for the 3D filter to calculate the <TxG(PA)> and LR(PA) values to be used for the comparison. A $\gamma$ value of at least 0.5 results in a meaningful improvement over the prior art and is selected as the cut-off point since it is approximately half way between the value for the appended stack with a metal only layer and the appended stack with extra non-absorbent layers. It will be appreciated that this figure is also an approximation because of the re-optimization of the layers

TABLE 2

| Design | LR | <TxG> | $\alpha$(LR) | $\alpha$(<TxG>) | $\gamma = \alpha$(<TxG>)/$\alpha$(LR) | Inconel Thickness [nm] |
| --- | --- | --- | --- | --- | --- | --- |
| Prior Art Stack (. . . H) | 73.99% | 94.37% | 0 | 0 | | |
| (. . . H) M | 35.00% | 62.84% | 0.5270 | 0.3341 | 0.6340 | 7.40 |
| (. . . H) L M | 35.00% | 63.05% | 0.5270 | 0.3319 | 0.6298 | 7.28 |
| (. . . H) L M H | 35.03% | 71.73% | 0.5266 | 0.2399 | 0.4556 | 7.10 |
| (. . . H) M H | 35.01% | 73.30% | 0.5268 | 0.2233 | 0.4238 | 13.47 |
| (. . . H) L M L H | 35.06% | 75.11% | 0.5262 | 0.2041 | 0.3879 | 9.35 |
| (. . . H) L M L | 34.96% | 75.74% | 0.5275 | 0.1974 | 0.3742 | 7.14 |
| (. . . H) LM (LH)^4 | 34.99% | 76.99% | 0.5271 | 0.1842 | 0.3494 | 7.11 |
| (. . . H) L M (LH)^5 | 35.01% | 77.01% | 0.5268 | 0.1840 | 0.3491 | 6.32 |

In the above table, H refers to a high refractive index layer, L refers to a low refractive index layer, M refers to a metal (absorbing layer), typically Inconel. A prior art stack (basic stack) of layers (without the absorbing layer) is denoted as ( . . . H), meaning that the outermost layer of the stack is a high refractive index layer H. Making the top layer a high refractive index layer has advantages in terms of the robustness and wear properties of the filter. (LH)^x means repeat an LH stack (i.e. pair of low and high refractive index layers x times). $\alpha$(X) represents the relative change of parameter X (=LR or <TxG>) calculated using the complete stack with respect to the value of X(PA) calculated with the prior art basic stack. Mathematically, $\alpha$(X)=1−X/X(PA). Similarly, $\gamma$ is the ratio of the relative change in <TxG> [$\alpha$(<TxG>)] to the relative change in LR [$\alpha$(LR)]; $\gamma=\alpha$(<TxG>)/$\alpha$(LR).

What this table shows is that a prior art basic stack consisting only of non-absorbing layers ( . . . H) has an LR(PA) value of 73.99% with a transmission in the green wavelength band of 94.37% [$\alpha$(<TxG(PA)>)]. The high LR value results in the undesirable back reflections noted above.

The addition of a metal layer M to a prior art . . . H stack reduces the LR value to 35%, but also reduces the transmission in the green wavelength band to 62.84%, giving the of the basic stack that takes place when the appended stack is added. For the purposes of defining the invention, a $\gamma$ value of at least 0.5 relative to result achieved when the thicknesses of the appended layers are set to 0 nm provides a convenient cut-off point.

As an additional experiment, the inventors took the ( . . . H) (L M L) design and changed the Inconel thickness only until LR=50%. The <TxG> value changed from 75.74% to 84.13%. They then refined ALL of the layer thickness in the stack (around 90 layers or so) and the <TxG> value increased only slightly to 84.40% (a change of 0.3% which is not significant). This enables the inventors to show, that for a given layer stack, once optimized for a given 3D filter specification, it is acceptable to just change the Inconel or metal layer thickness only in order to achieve the desired LR value while ensuring that the <TxG> value will be close to optimal.

Figure 12:
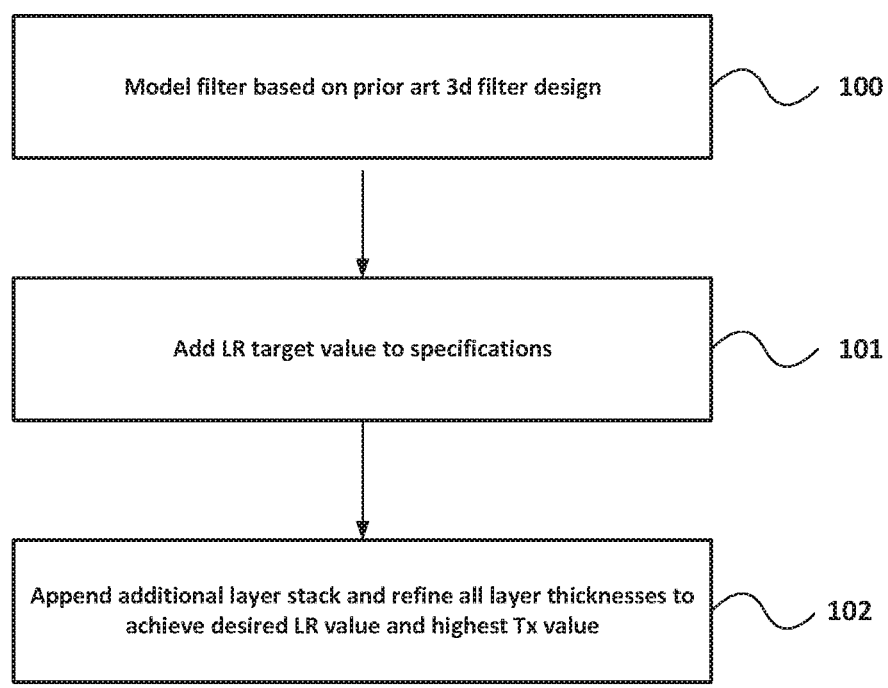
FIG. 12 is a diagram illustrating the method of manufacturing a lens in accordance with an embodiment of the invention.

In order to achieve the smallest $\gamma$ value while minimizing any other undesired changes to rest of the desired 3D filter properties, the method illustrated in FIG. 12 is employed. The first step 100 is to take the existing (already optimized) 3D filter design based on a stack of non-absorbing layers and use this computer model to generate transmittance values from 400 to 700 nm for one or more angles of incidence:

these transmittance values are then used as the new filter specifications. In addition, a luminance back reflectance (LR) target value is also added to the set of filter specifications. The tolerances of all the filter specifications are then adjusted such that the model LR will be within ±1% of the target LR. It is important not to weight the LR filter specification by too much or by too little; otherwise, the optimum LR and <Tx> values will not be obtained.

At this point, an additional layer stack (with one or more absorbing layers) is then appended to the previous stack (which was the basis of the prior art 3D filter design that has a relatively high luminance back reflectance). All the layer thicknesses are then refined 102 (for layers in both the previous stack and the new additional layer stack) until the desired LR value is reached and the highest Tx value for all the passbands are reached. Based on various simulations (as outlined above), the best additional layer stacks to use are the minimum 3 layer stack (i.e., [L M L] or [H M H]) or a larger stack (i.e., L M [L H]^4).

Figure 13:
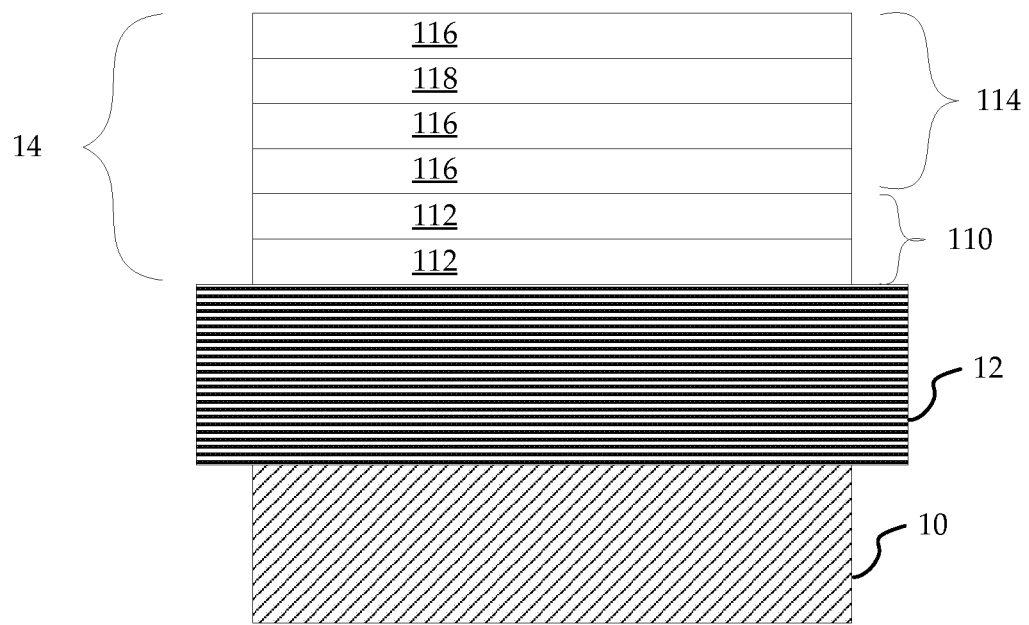
FIG. 13 shows detailed structure of the optical interference filter shown in FIG. 1.

The resulting structure is shown in FIG. 13, which shows the coated lens of FIG. 1 in more detail. The coated lens of FIG. 13 is shown as having parallel planar sides but more generally the sides of the lens can be curved, as depicted in FIG. 1, and the two sides may have different curvatures. The first 3D filter with reduced back reflectance 14 and the second 3D filter with reduced back reflectance 10 are deposited on either side of the lens 12. Each 3D filter with reduced back reflectance comprises a basic stack 110 of non-absorbing thin film layers 112 and an appended stack 114 of at least three layers 116 incorporating one or more absorbing layers 118 in the form of thin film metal or semiconductor layers. FIG. 13 shows the basic stack 110 having two non-absorbing layers 112, and the appended stack 114 having three layers incorporating a single absorbing layer. However, more generally there is a plurality of non-absorbing thin film layers 112, and at least three layers 116 incorporating one or more absorbing layers 118. The second 3D filter 10 has a similar structure to that of the first 3D filter 14, but this is not shown for the sake of clarity. In embodiments in which the 3D filter with reduced back reflectance is on only one surface of the lens, as in FIG. 2 and FIG. 3, the 3D filter has the same detailed structure as shown in FIG. 13, although this detailed structure is not illustrated.

The decision to use the thicker additional layer stack over the minimum 3 layer stack will depend on whether the increased <Tx> values for a passband for a given LR value is worth the increased layer count and deposition time. While it is possible to get a reduction in LR using only a single absorbing layer, however, there is a large <Tx> loss which is easy to avoid by adding two non-absorbing layers of the same material on both sides of the single absorbing layer.

Further simulations we carried out with different metals for the absorbing layer. Silver showed a slight improvement in performance over Inconel. Titanium is also a possibility that could give a slight improvement in performance.

We claim:

1. A lens for 3D glasses with reduced back reflectance having an optical interference filter deposited on one or both sides thereof, said optical interference filter comprising:
   a basic stack of non-absorbing thin film layers based on a filter design without reduced back reflection, the number, materials and thicknesses of said thin film layers being selected such that the 3D optical interference filter has substantial transmittance at one or more passbands over the visible spectral range in order to view a desired left or right eye image; and
   an appended stack of at least three layers incorporating one or more absorbing layers in the form of thin film metal or semiconductor layers effective to reduce back reflectance and having a substantial reflectance and absorption at one or more different blocking bands over the visible spectral range in order to block the undesired right or left eye image;
   wherein the (relative change in transmittance)/(relative change in luminance back reflectance) ratio for at least one of said passbands is less than about 0.5, where the relative change is with respect to the transmittance and luminance back reflectance performance based on setting the thicknesses of said one or more absorbing layers to 0 nm.

2. A lens as claimed in claim 1, wherein said appended stack of layers has a structure of L M (L H)^n, where n≥1, L represents a low refractive index layer, H represents a high refractive index layer, and M represents a metal or semiconductor layer.

3. A lens as claimed in claim 1, wherein said optical interference filter comprises at least 10 more layers, including said one or more absorbing layers required to achieve similar 3D filter performance without any reduction in back reflectance resulting from said one or more absorbing layers.

4. A lens as claimed in claim 1, wherein both surfaces of the said lens have a positive radius of curvature and the said optical interference filter is deposited on the concave side of said lens.

5. A lens as claimed in claim 4, further comprising an anti-reflectance coating deposited on the convex side of the said coated lens to increase the transmittance through the coated lens and further reduce the back reflectance.

6. A lens as claimed in claim 1, wherein the thicknesses of the thin film layers of the basic stack are different from the thicknesses required to achieve a similar 3D filter performance without any reduction in back reflectance resulting from said one or more absorbing layers in order to increase the transmittance through the coated lens and further reduce the back reflectance of the combination of the basic stack an appended stacked.

7. A lens as claimed in claim 1, wherein a topmost layer of the basic stack of non-absorbing thin film layers is a high refractive index layer.

8. A lens as claimed in claim 1, wherein said one or more absorbing thin film layers are sandwiched on one or both sides by adjacent thin metal or semiconductor layers that form a finite, thin stable dielectric layer.

9. 3D glasses with reduced back reflectance, comprising a frame containing a pair of 3D coated lenses as claimed in claim 1.

10. A lens as claimed in claim 1, wherein said appended stack of layers has a structure of L M (L H)^n, where n≥1, L represents a low refractive index layer, H represents a high refractive index layer, and M represents a metal or semiconductor layer.

11. A method of making a lens for 3D glasses with reduced back reflectance having an optical interference filter deposited on one or both sides thereof, comprising:
   creating a computer model of a 3D optical interference filter comprising a basic stack of non-absorbing thin film layers necessary to achieve the desired 3D filter optical performance and an appended stack of thin film layers, incorporating one or more substantially absorbing thin film layers in the form of metal or semiconductor effective to reduce back reflectance, placed adjacent to the said basic stack, with the total stack of layers having substantial transmittance at one or more passbands over the visible spectral range in order to view a desired left or right eye image, and a substantial reflectance and absorption at one or more different blocking bands over the visible spectral range in order to block the undesired right or left eye image;

varying in said computer model at least one variable selected from the group consisting of the material, thickness and number of said thin film layers to ensure at least one of said passbands has a (relative change in transmittance/(relative change in luminance back reflectance) ratio less than about 0.5, where the relative change is with respect to the transmittance and luminance back reflectance performance based on the said previous stack of non-absorbing layers; and depositing said absorbing and non-absorbing layers on a lens substrate in accordance with said computer model.

12. A method as claimed in claim 11, wherein the appended stack of said layers comprises at least three layers, one of which is said substantially absorbing thin film layer.

13. A method as claimed in claim 11, wherein the basic stack of layers is based on a filter design without reduced back reflection.

14. A method as claimed in claim 11, wherein the basic stack of layers is based on a filter design without reduced back reflection and/or said appended stack of layers includes at least three layers including said one or more absorbing layers.

15. A method as claimed in claim 11, wherein said one or more absorbing layers are made from an austenite nickel-chromium-based superalloy.

16. A method as claimed in claim 11, comprising only a single said substantially absorbing layer.

17. A method as claimed in claim 11, wherein both surfaces of the said lens have a positive radius of curvature, said optical interference filter being deposited on the concave side of said lens.

18. A method as claimed in claim 17, further comprising depositing an anti-reflectance coating on the convex side of the said coated lens to increase the transmittance through the coated lens and further reduce the back reflectance.

19. A method as claimed in claim 11, further comprising adjusting the thicknesses of all the thin film layers to increase the bandwidths of the transmittance passbands beyond what is necessary to transmit desired image wavelengths in order to increase the transmittance through the coated lens and further reduce the back reflectance.

20. A lens for 3D glasses with reduced back reflectance having an optical interference filter deposited on one or both sides thereof, said optical interference filter comprising:

a basic stack of non-absorbing thin film layers based on a filter design without reduced back reflection, the number, materials and thicknesses of said thin film layers being selected such that the 3D optical interference filter has substantial transmittance at one or more passbands over the visible spectral range in order to view a desired left or right eye image, and a substantial reflectance and absorption at one or more different blocking bands over the visible spectral range in order to block the undesired right or left eye image, characterized in that said optical interference filter further comprises:

an appended stack of at least three layers incorporating one or more absorbing layers in the form of thin film metal or semiconductor layers effective to reduce back reflectance; and wherein the (relative change in transmittance)/(relative change in luminance back reflectance) ratio for at least one of said passbands is less than about 0.5, where the relative change is with respect to the transmittance and luminance back reflectance performance based on setting the thicknesses of said one or more absorbing layers to 0 nm.

* * * * *